United States Patent [19]

Adrian

[11] Patent Number: 4,730,957
[45] Date of Patent: Mar. 15, 1988

[54] METHOD OF CALIBRATING A PNEUMATIC CONVEYING APPARATUS

[75] Inventor: Franz-Josef S. Adrian, Lippetal, Fed. Rep. of Germany

[73] Assignee: Krupp Polysius AG, Beckum, Fed. Rep. of Germany

[21] Appl. No.: 909,604

[22] Filed: Sep. 22, 1986

[30] Foreign Application Priority Data

Oct. 22, 1985 [DE] Fed. Rep. of Germany ....... 3537538

[51] Int. Cl.⁴ .............................................. B65G 53/18
[52] U.S. Cl. .................................. 406/142; 406/14; 406/25; 406/32
[58] Field of Search ...................... 406/10, 14, 24, 25, 406/30, 32, 138, 142, 143

[56] References Cited

U.S. PATENT DOCUMENTS

| | | | |
|---|---|---|---|
| 3,964,793 | 6/1976 | Volpeliere | 406/138 X |
| 4,029,365 | 6/1977 | Ahrens et al. | 406/142 X |
| 4,545,704 | 10/1985 | Heinemann | 406/143 X |

*Primary Examiner*—Joseph F. Peters, Jr.
*Assistant Examiner*—James M. Kannofsky
*Attorney, Agent, or Firm*—Learman & McCulloch

[57] ABSTRACT

A method of calibrating a pneumatic conveying apparatus wherein, with the material supply interrupted, a conveying pressure is numerically integrated and the reduction in the filling weight occurring in a specific period of time is determined. Before the beginning and at the end of the integration it is determined whether the filling weight is falling approximately evenly, i.e., whether any disturbing dynamic forces are overlying the filling weight. Such a calibration method permits alterations in the conveying capacity during the calibration.

2 Claims, 4 Drawing Figures

METHOD OF CALIBRATING A PNEUMATIC CONVEYING APPARATUS

The invention relates to pneumatic conveying apparatus and more particularly to such apparatus.

BACKGROUND OF THE INVENTION

Pneumatic conveying apparatus for material is disclosed in German Patent Specification No. A-33 09 210.9. The discharge capacity of such pneumatic conveying apparatus can be increased by transferring material from the storage chamber to the conveyor vessel and reduced by transferring material from the conveyor vessel to the storage chamber. Such a conveying apparatus is distinguished by the fact that changes in the conveying capacity can be made very quickly and it is possible to keep the conveying capacity constant with great accuracy.

According to the German patent specification the known conveying apparatus is calibrated as follows:

With the material supply connection closed, a specific filling level first is set in the conveyor vessel and kept constant by means of the pressure in the storage chamber. The pneumatic conveying pressure thus set in the conveying vessel is measured. Then the reduction in weight of the whole system which occurs during the specific conveying interval is determined and from this the conveying capacity, i.e., the quantity of material discharged per unit of time, is calculated. In this way the first point of the desired function (conveying capacity as a function of the pneumatic conveying pressure) is obtained. Then the same process is repeated, setting another filling level in the conveyor vessel and thus another conveying capacity. By repeating this measurement a number of times any number of points of the desired calibration function can be obtained.

When using the known calibration method it is necessary to alter the conveying capacity during calibration. However, for operational reasons this is not generally desirable since such calibration frequently has to be carried out while the pneumatic conveying apparatus is running and the pneumatic conveying capacity is predetermined by the consumer. For example, it is most undesirable to have to alter the burner capacity during the calibration of a pneumatic conveying apparatus which serves to supply fuel to a burner.

A principal object of the invention is to provide a method of calibration wherein the gauging can be carried out without restricting the running of the apparatus, and in particular without its being necessary to alter the pneumatic conveying capacity. On the other hand the calibration method should be designed so that alterations in the pneumatic conveying capacity which are caused by the running of the apparatus and which may occur during the calibration do not disrupt the calibration process.

SUMMARY OF THE INVENTION

The invention is based upon the recognition that in a pneumatic conveying apparatus there is a linear dependence between the pneumatic conveying pressure and the conveying capacity and that furthermore the empty resistance (i.e., the pneumatic conveying pressure at zero conveying capacity) is constant during conveying. Under these conditions it is sufficient for the determination of the desired calibration function (dependence of the conveying capacity upon the conveying pressure) to determine the empty resistance and the inclination of the lines in question (the so-called calibration factor).

In view of the linear dependence between the conveying capacity and the conveying pressure, the determination of the calibration factor is not restricted if alterations are made to the theoretical value for the conveying capacity during the calibration process. Therefore, the running of the pneumatic conveying apparatus is not restricted by the calibration.

On the other hand, it is essential for accurate calibration that during the taking (sensing) of the filling weights $m(t_1)$ and $m(t_2)$ there are no great fluctuations in the weighing signal (such as can occur for example when cleaning of the filter has an effect on the measurement of the filling weight). Therefore, according to the invention the integration of the pressure value does not begin until after the filling level has fallen approximately evenly after interruption of the material supply during a predetermined time period. A corresponding investigation also takes place at the end of the calibration process.

THE DRAWINGS

The invention is disclosed in greater detail in the following description and the accompanying drawings, wherein:

FIG. 1 is a schematic representation of a pneumatic conveying apparatus to be calibrated by the method according to the invention; and FIGS. 2, 3, and 4 are diagrams explanatory of the calibration process.

DETAILED DESCRIPTION

Figure 1:
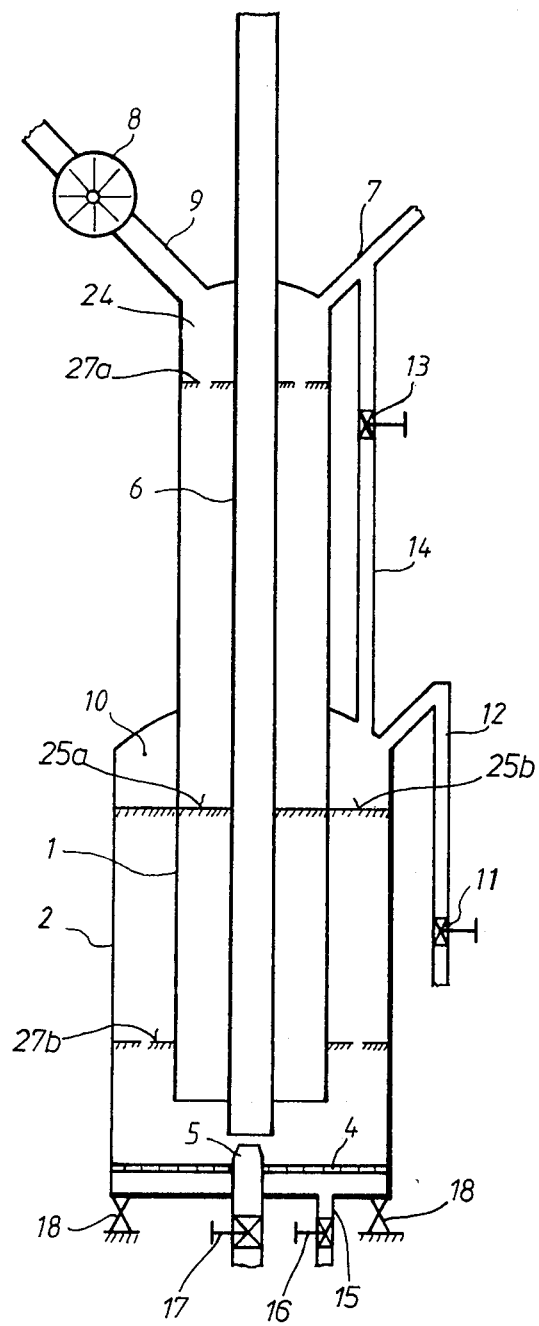

The pneumatic conveying apparatus according to FIG. 1 contains a conveyor vessel 1 and an annular storage chamber 2 which is arranged coaxially with the conveyor vessel 1. The conveyor vessel 1 is open at the lower end and projects into the storage chamber 2 and these two parts of the apparatus are connected to each other like communicating pipes.

The conveyor vessel 1 and the storage chamber 2 are provided with a common pneumatic aerating base 4.

A conveyor nozzle 5 passes through the aerating base 4 and above it is located the inlet of a pneumatic feed pipe 6 which passes through the conveyor vessel 1 in a vertical direction.

An air vent connection 7 and a material supply connection 9 provided with a bucket wheel charging valve 8 are provided in the upper region of the conveyor vessel 1.

The air-filled upper region 10 of the storage chamber 2 is connected to an air supply connection 12 regulated by a valve 11 and to an air extraction connection 14 regulated by a valve 13.

The space below the aerating base 4 is provided with an air supply connection 15 in which a constant quantity regulating valve 16 is arranged. A further such valve 17 is arranged upstream of the conveyor nozzle 5.

The conveying apparatus formed by the conveyor vessel 1 and the storage chamber 2 is supported on pressure sensitive cells 18 of known kind.

In operation, the apparatus according to FIG. 1 functions as follows:

If there is atmospheric pressure in the upper region 10 of the storage chamber 2 (as there always is above the air vent connection 7 in the upper region 24 of the conveyor vessel 1), then the respective filling levels 25a and 25b of material in the conveyor vessel 1 and in the storage chamber 2 are the same. The pneumatic aerating pressure (introduced via the air supply connection 15) or the approximately equally great pneumatic pressure at the conveying nozzle 5 corresponds to the filling level in the conveyor vessel 1 or a specific conveying capacity. As such material is then delivered via the material supply connection 9 to the conveyor vessel 1 as is discharged via the conveyor pipe 6.

If for any reason fluctuations occur in the material supply, then the filling level in the conveyor vessel 1 is kept constant at the predetermined value by transferring material from the storage chamber 2 to the conveyor vessel in the event of any lowering of the filling level in the conveyor vessel 1. This is achieved by increasing the pressure in the upper region 10 of the storage chamber 2. On the other hand, if the filling level in the conveyor vessel 1 rises above the value corresponding to the desired conveying capacity, then the pressure in the upper region 10 of the storage chamber 2 is reduced and as a result material is transferred from the conveyor vessel 1 to the storage chamber 2.

If the discharge capacity of the conveyor vessel 1 is to be rapidly increased, which necessitates a corresponding increase in the filling level in the conveyor vessel 1, then a correspondingly higher pressure is built up in the storage chamber 2 so that a filling level 27b is set in the storage chamber 2 and a filling level 27a is set in the conveyor vessel 1. If a higher discharge capacity is required, material is promptly forced out of the storage chamber 2 into the conveyor vessel 1. If on the other hand it is desired to reduce the discharge capacity of the conveyor vessel 1 by reducing the pressure in the storage chamber 2 (effected by opening the valve 13) material is quickly transferred from the conveyor vessel 1 to the storage chamber 2.

The calibration of the pneumatic conveying apparatus using the method according to the invention is described below, and with regard to the symbols used reference is made to the explanation of symbols at the end of this specification.

Figure 2:
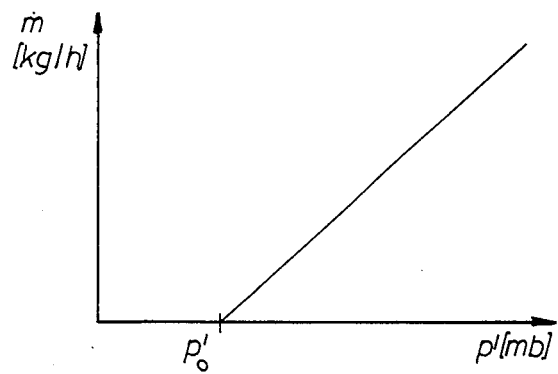

In tests of the invention it was established that there is a linear dependence between the conveying pressure p' and the conveying capacity ṁ as shown in FIG. 2, the empty resistance p'$_o$ being constant during conveying. The inclination of the straight lines is designated hereafter as the calibration factor k.

According to FIG. 2 the following relationship exists between the conveying capacity ṁ, the calibration factor k and the pressure value p (the difference between the conveying pressure p' and the empty resistance p'o):

$$\dot{m} = k \cdot (p' - p'_o) = k \cdot p \qquad \text{[Equation 1]}$$

It is the object of the calibration to determine the unknown calibration factor k.

For calibration the material supply to the conveyor vessel 1 (via the material supply connection 9) is interrupted. The filling level in the conveyor vessel 1 corresponding to the then currently required conveying capacity is kept constant in the manner already described by controlling the pressure in the upper region 10 of the storage chamber 2. Thus during calibration the later supply of material to the conveyor vessel 1 takes place exclusively through the storage chamber 2.

The reduction in the filling weight m of the whole conveying apparatus over the time t is a measurement for the conveying capacity:

$$\dot{m} = -\frac{dm}{dt} \qquad \text{[Equation 2]}$$

Figure 3:
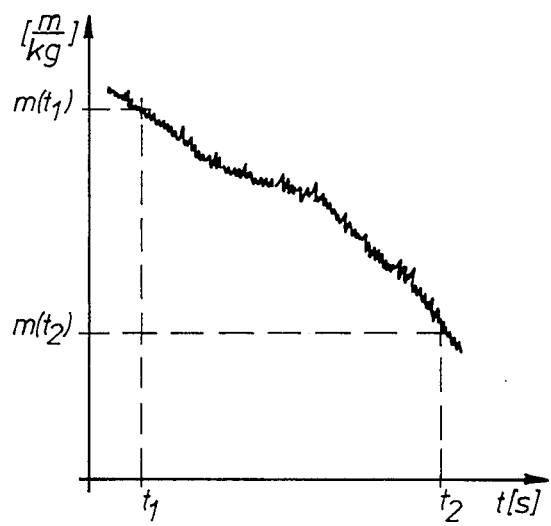

FIG. 3 shows the reduction in the filling weight m occurring during the calibration process. It is assumed here that the calibration begins at the time $t_1$ and ends at the time $t_2$. The filling weight at the beginning of the calibration process is $m(t_1)$ and at the end $m(t_2)$. Equations 1 and 2 give:

$$-\frac{dm}{dt} = k \cdot p(t) \qquad \text{[Equation 3]}$$

This results in:

$$-\int_{t_1}^{t_2} dm = k \cdot \int_{t_1}^{t_2} p(t)dt \qquad \text{[Equation 4]}$$

$$-[m(t_2) - m(t_1)] = \Delta m = k \cdot \int_{t_1}^{t_2} p(t)dt \qquad \text{[Equation 5]}$$

If the integration of the pressure value p(t) over the time is carried out by means of numeric integration in n sensing steps, then equation 5 can be written as follows:

$$\Delta m = k \cdot \Delta t \cdot \sum_{i=1}^{n} pi \qquad \text{[Equation 6]}$$

This gives the calibration factor which is sought as follows:

$$k = \frac{\Delta m}{\Delta t \cdot \sum_{i=1}^{n} pi} \qquad \text{[Equation 7]}$$

Figure 4:
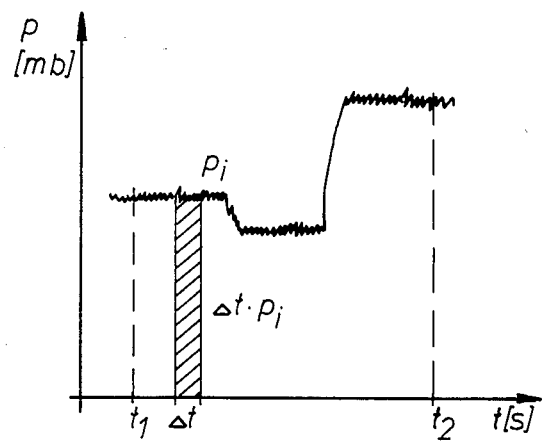

FIG. 4 shows a plot of the pressure p during the calibration process, in which it is assumed that during the calibration two alterations are made to the conveying capacity.

With the calibration factor k thus obtained the theoretical value and the actual value for the conveying capacity are corrected. For example in the case of a factor k which is greater by 5%, the theoretical value and the actual value are also raised by 5%. The actual conveying capacity is not altered by this.

At the beginning and end of the calibration process the filling weight signal is checked to ascertain whether there are any great signal fluctuations which are due to external disturbances. Thus, the integration of the pressure value p at $t_1$, taking the filling weight $m(t_1)$ existing at the beginning of the calibration, only begins after the filling weight has fallen approximately evenly after interruption of the material supply during a predetermined period of time (see FIG. 3). The integration of the pressure value p is only ended, and at the same time the filling weight $m(t_2)$ then existing is taken, when a minimum quantity $\Delta m(min)$ has been extracted and the filling weight has fallen approximately evenly during a predetermined further period of time. The calibration is interrupted when a predetermined maximum quantity $\Delta m(max)$ is exceeded.

Explanation of the symbols used:
ṁ: conveying capacity
p'$_o$: empty resistance p': conveying pressure (air pressure upstream of the conveying nozzle 5 or pressure below or above the aerating base 4)

p: difference between conveying pressure p' and empty resistance $p'_o$ p(t): function of p with the time t pi: values of p at the n sensing times between $i=1$ and $i=n$ k: calibration factor m: filling weight of the conveying apparatus dm/dt: alteration in the filling weight over the time t $m(t_1)$: filling weight at the beginning of the calibration (time $t_1$)

$m(t_2)$: filling weight at the end of the calibration (time $t_2$)

$\Delta m$: $m(t_1) - m(t_2)$ $\Delta m(min)$: minimum quantity of $\Delta m$ $\Delta m(max)$: maximum quantity of $\Delta m$ $\Delta t$: time between two sensing steps n: number of sensing steps during the calibration.

I claim:

1. In a method of calibrating a pneumatic conveying apparatus including;

(a) a conveyor vessel having a conveying nozzle in its base, a material supply in its upper region, and a pneumatic conveyor pipe near the conveying nozzle, said conveying apparatus having a pneumatic conveying pressure and a conveying capacity determined by the level of material in the conveyor vessel;

(b) a storage chamber connected to the conveyor vessel according to the principle of communicating pipes, said conveying apparatus having a discharge capacity which is increased by transferring material from the storage chamber to the conveyor vessel and reduced by transferring material from the conveyor vessel to the storage chamber;

the improvement comprising:

(c) interrupting the supply of material to said conveyor vessel and during the interruption numerically integrating the pressure difference (p) between the pressure (p') at the which the material is being conveyed within the conveyor pipe and the resistance ($p'_o$) within said pipe at zero conveying capacity and determining the reduction ($\Delta m$) in the weight of material present in the conveyor vessel occurring in a period of time ($\Delta t$);

(d) taking the weight $m(t_1)$ of material in said conveyor vessel at the beginning of the calibration and the start of the integration of the pressure difference (p) occurring only after the filling weight has fallen approximately evenly during a predetermined period of time after interruption of the material supply;

(e) ending the integration of the pressure difference (p) and at the same time taking the weight $m(t_2)$ of material then existing in said conveyor vessel when a minimum quantity [m(min)] has been extracted and the filling weight has fallen approximately evenly during a predetermined further period of time;

(f) discontinuing the calibration when a predetermined maximum quantity [$\Delta m(max)$] is exceeded; and (g) determining from the results so obtained a calibrating factor (k) for the conveying apparatus without restricting the running thereof or altering the pneumatic conveying capacity.

2. The method according to claim 1 wherein the predetermined theoretical value and the actual measured value for the conveying capacity are altered according to the calibration factor (k) obtained.

* * * * *